United States Patent
Ye et al.

(10) Patent No.: US 8,264,999 B2
(45) Date of Patent: Sep. 11, 2012

(54) METHOD AND DEVICE FOR REALIZING PAGING IN MOBILE SWITCHING CENTER POOL

(75) Inventors: Sihai Ye, Shenzhen (CN); Xiaochun Cui, Shenzhen (CN); Hualin Luo, Shenzhen (CN); Runsheng Han, Shenzhen (CN); Xinhua Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 12/642,024

(22) Filed: Dec. 18, 2009

(65) Prior Publication Data

US 2010/0097974 A1 Apr. 22, 2010

Related U.S. Application Data

(63) Continuation of application No. PCT/CN2008/071379, filed on Jun. 20, 2008.

(30) Foreign Application Priority Data

Jun. 20, 2007 (CN) .......................... 2007 1 0111434

(51) Int. Cl.
*H04H 20/71* (2008.01)
(52) U.S. Cl. ......... 370/312; 370/352; 370/353; 455/436
(58) Field of Classification Search .................. 370/312, 370/352, 353; 455/436
See application file for complete search history.

(56) References Cited

U.S. PATENT DOCUMENTS

| 6,763,004 | B1 | 7/2004 | De Oliveira | |
|---|---|---|---|---|
| 2001/0036173 | A1 | 11/2001 | Shmulevich et al. | |
| 2002/0187793 | A1 | 12/2002 | Papadimitriou et al. | |
| 2005/0054348 | A1* | 3/2005 | Turina et al. | 455/453 |
| 2007/0091877 | A1* | 4/2007 | Lundin et al. | 370/353 |

FOREIGN PATENT DOCUMENTS

CN 1668117 A 9/2005
(Continued)

OTHER PUBLICATIONS

"3rd Generation Partnership Project; Technical Specification Group Services and System Aspects; Intra-domain Connection of Radio Access Network (RAN) Nodes to Multiple Core Network (CN) Nodes (Release 6)," *3GPP*, TS 23.236 V6.3.0, 1-37 (Mar. 2006).

(Continued)

*Primary Examiner* — Ricky Ngo
*Assistant Examiner* — Richard K Chang
(74) *Attorney, Agent, or Firm* — Leydig, Voit & Mayer, Ltd.

(57) ABSTRACT

A method for realizing paging in a mobile switching center (MSC) pool includes the following steps. An MSC server selects a media gateway (MGW) from more than one MGW connected to a base station controller (BSC)/radio network controller (RNC), delivers a paging message of an international mobile station identity (IMSI) paging type to the selected MGW, and stores a corresponding relation between an IMSI carried in the paging message and the MSC server in the MGW which is connected to the BSC/RNC and does not receive the paging message. The MGW that does not receive the paging message receives a paging response message sent by the BSC/RNC, determines an MSC server corresponding to an IMSI carried in the paging response message by looking up the corresponding relation between the IMSI and the MSC server stored therein, and routes the received paging response message to the corresponding MSC server. Several other methods and devices for realizing paging are also provided.

6 Claims, 7 Drawing Sheets

FOREIGN PATENT DOCUMENTS

| | | | |
|---|---|---|---|
| CN | 1714590 | A | 12/2005 |
| EP | 1991015 | A1 | 11/2008 |
| EP | 2046069 | A1 | 4/2009 |

OTHER PUBLICATIONS

European Patent Office, Extended European Search Report in European Patent Application No. 08757788.8 (Sep. 7, 2010).

State Intellectual Property Office of the People'S Republic of China, English Translation of Written Opinion of the International Searching Authority in International Patent Application No. PCT/CN2008/071379 (Oct. 16, 2008).

Ericsson, "Softswitch in Mobile Networks," Ericsson White Paper, XP-002499452 pp. 1-19 (Apr. 2005).

Fyro et al., "Media Gateway for Mobile Networks," Ericsson Review vol. 77, No. 4, XP-000969929, pp. 216-223 (Jan. 1, 2000).

\* cited by examiner

METHOD AND DEVICE FOR REALIZING PAGING IN MOBILE SWITCHING CENTER POOL

CROSS-REFERENCE TO RELATED APPLICATIONS

This application is a continuation of International Application No. PCT/CN2008/071379, filed on Jun. 20, 2008, which claims priority to Chinese Patent Application No. 200710111434.9, filed on Jun. 20, 2007, both of which are hereby incorporated by reference in their entireties.

FIELD OF THE INVENTION

The present invention relates to the field of mobile communication technology, and more particularly to a method and a device for realizing paging in a mobile switching center (MSC) pool.

BACKGROUND OF THE INVENTION

In the conventional mobile communication network architecture, one MSC can be connected to a plurality of base station controllers/radio network controllers (BSCs/RNCs), but one BSC/RNC can only be connected to one MSC. The connection relationship of 1:N between the MSC and the BSC/RNC limits the networking flexibility. In order to solve this problem, Iu-Flex/A-Flex was introduced for Global System for Mobile communications (GSM), Code Division Multiple Access (CDMA), Wideband Code Division Multiple Access (WCDMA), Time Division-Synchronous Code Division Multiple Access (TD-SCDMA), and other fields, since Release 5 of the 3rd Generation Partnership Project (3GPP) (3GPP R5).

Iu-Flex/A-Flex supports the connection of one BSC/RNC to a plurality of MSCs. An area covered by a plurality of MSCs is referred to as an MSC pool, and user equipment (UE) can move in the pool without changing a serving MSC. The routing function in the pool is implemented through a network resource indicator (NRI). When a UE performs location update or initiates a call, an NAS node selection function (NNSF) node selects an MSC according to NRI information contained in a temporary mobile subscriber identity (TMSI) in an initial non-access stratum (NAS) message initiated by the UE, and routes the initial NAS message. The NNSF node may be a BSC, an RNC, a media gateway (MGW), or other nodes.

When the UE is called terminal, the initial NAS message is a paging response message. If the paging is of a TMSI paging type, the UE carries TMSI information in the paging response message. In this case, after receiving the paging response message, the NNSF node acquires NRI information from the TMSI, and then routes the paging response message to a correct MSC according to the NRI. If the paging is of an international mobile station identity (IMSI) paging type, the UE carries information about the IMSI in the paging response message. In this case, because the IMSI does not contain NRI information, the NNSF node cannot acquire information about an MSC that delivers a paging message from the IMSI. Therefore, the NNSF node cannot route the paging response message to the correct MSC.

In order to solve this problem, a paging mode for the paging of the IMSI paging type is proposed in the 3GPP 23.236 protocol as follows. An MSC delivers a paging message of the IMSI paging type, and an NNSF node receives the paging message and records a corresponding relation between an IMSI carried in the paging message and the MSC that delivers the paging message, for example, a corresponding relation between the IMSI and an NRI, a corresponding relation between the IMSI and a signaling point of the MSC, or a corresponding relation between the IMSI and a global core network identifier (Global CN-ID). After receiving a paging response message carrying an IMSI, the NNSF node queries the corresponding relation between the IMSI and the MSC recorded therein according to the information about the IMSI carried in the paging response message, and then selects a correct MSC according to the corresponding relation for routing the paging response message.

When the NNSF function is implemented on a BSC/RNC, that is, the NNSF node is a BSC/RNC, the paging mode for the paging of the IMSI paging type proposed in the 3GPP 23.236 protocol is feasible. However, when the NNSF function is implemented independent of the BSC/RNC, the paging mode easily causes a paging failure. For example, referring to International Patent Application No. PCT/CN2007/001047, in softswitch architecture where an MSC includes MSC servers and MGWs, when the NNSF function is implemented on the MGWs, that is, NNSF nodes are the MGWs, a paging process adopting the paging mode for the paging of the IMSI paging type proposed in the 3GPP 23.236 protocol is shown in FIG. 1.

Referring to FIG. 1, an MSC Server 1 and an MSC Server 2 belong to the same MSC pool. When the NNSF function is implemented on the MGWs, the paging process in FIG. 1 mainly includes the following steps. The MSC Server 1 performs paging by using an IMSI, and delivers a paging message carrying information about the IMSI. An MGW 1 receives the paging message delivered by the MSC Server 1, records a corresponding relation between the IMSI carried in the paging message and the MSC Server 1, and forwards the paging message to a BSC/RNC specified in the message. After receiving a paging response message, the BSC/RNC selects an MGW from the MGW 1 and an MGW 2 according to a link load balancing principle, and forwards the paging response message to the selected MGW. If the MGW 1 is selected, the MGW 1 routes the paging response message to the MSC Server 1 according to the corresponding relation between the IMSI and the MSC Server 1 recorded therein. If the MGW 2 is selected, because the MGW 2 does not store the corresponding relation between the IMSI and the MSC Server 1, the MGW 2 cannot correctly route the paging response message to the MSC Server 1, thus causing a paging failure.

SUMMARY OF THE INVENTION

Accordingly, the present invention includes a method and a device for realizing paging in an MSC pool, so as to improve the paging success ratio.

In order to achieve the above objective, a first technical solution of the present invention is provided as follows.

An embodiment of the present invention provides a method for realizing paging in an MSC pool includes the following steps:

An MSC server selects an MGW from more than one MGW connected to a BSC/RNC that receives a paging message, delivers a paging message of an IMSI paging type to the selected MGW, and stores a corresponding relation between an IMSI carried in the paging message and the MSC server that delivers the paging message in the MGW which is connected to the BSC/RNC and does not receive the paging message.

The MGW that does not receive the paging message receives a paging response message sent by the BSC/RNC, determines an MSC server corresponding to an IMSI carried in the paging response message by looking up the corresponding relation between the IMSI and the MSC server stored therein, and routes the received paging response message to the corresponding MSC server.

Correspondingly, one embodiment of the present invention further provides an MSC server and an MGW.

The MSC server includes a paging message delivery unit and a corresponding relation sending unit. The paging message delivery unit is configured to select an MGW from more than one MGW connected to a BSC/RNC that receives a paging message, deliver a paging message of an IMSI paging type to the selected MGW, and send information about the selected MGW to the corresponding relation sending unit. The corresponding relation sending unit is configured to receive the MGW information sent by the paging message delivery unit and to send a corresponding relation between an IMSI carried in the paging message and the MSC server to the MGW which is connected to the BSC/RNC, and does not receive the paging message.

The MGW includes a paging message forwarding unit and a corresponding relation sending unit. The paging message forwarding unit is configured to send a received paging message to a BSC/RNC specified in the message, store a corresponding relation between an IMSI carried in the message and an MSC server that delivers the message, and send the corresponding relation between the IMSI and the MSC server to the corresponding relation sending unit. The corresponding relation sending unit is configured to receive the corresponding relation sent by the paging message forwarding unit, and send the received corresponding relation to other MGWs connected to the specified BSC/RNC.

It can be seen that, in the first technical solution of the present invention, when delivering the paging message, the corresponding relation between the IMSI and the MSC server has been stored in the MGW that does not receive the paging message, the MGW being connected to the BSC/RNC receiving the paging message, so that after receiving the paging response message sent by the BSC/RNC, the MGW that does not receive the paging message can correctly route the received paging response message to the corresponding MSC server according to the corresponding relation between the IMSI and the MSC server stored therein. As such, the problem that the route of the paging response message cannot be determined is avoided, thereby improving the paging success ratio.

A second technical solution of the present invention is provided as follows. One embodiment of the present invention provides a method for realizing paging in an MSC pool, which includes the following steps:

An MSC server selects an MGW from more than one MGW connected to a BSC/RNC that receives a paging message, and delivers a paging message of an IMSI paging type to the selected MGW.

The MGW that does not receive the paging message receives a paging response message sent by the BSC/RNC, and broadcasts the received paging response message to all MSC servers in the MSC pool.

The MSC server that sends the paging message corresponding to the paging response message receives and processes the paging response message, and the MSC server that does not send the corresponding paging message discards the received paging response message.

Correspondingly, one embodiment of the present invention further provides an MGW, which includes a message receiving unit and a message broadcast unit.

The message receiving unit is configured to receive a paging response message sent by a BSC/RNC, and send the received paging response message to the message broadcast unit after determining that no corresponding relation between an IMSI carried in the message and an MSC server exists.

The message broadcast unit is configured to broadcast the received paging response message to all MSC servers in an MSC pool.

In the second technical solution of the present invention, after receiving the paging response message sent by the BSC/RNC, the MGW that does not receive the paging message routes the received paging response message to all MSC servers in the MSC pool, the MSC server that sends the corresponding paging message receives and processes the paging response message, and the MSC server that does not send the corresponding paging message directly discards the received paging response message. As such, the problem that the paging response message cannot be routed is avoided, thereby improving the paging success ratio.

A third technical solution of the present invention is provided as follows. One embodiment of the present invention provides a method for realizing paging in an MSC pool, which includes the following steps:

An MSC server selects an MGW from more than one MGW connected to a BSC/RNC that receives a paging message, and delivers a paging message of an IMSI paging type to the selected MGW.

The MGW that does not receive the paging message receives a paging response message carrying information about an IMSI sent by the BSC/RNC, and broadcasts a query message carrying the information about the IMSI to all MSC servers in the MSC pool.

The MSC server that sends the paging message corresponding to the IMSI receives the query message, and returns a query response acknowledging that the MSC server sends the corresponding paging message to the MGW that does not receive the paging message. The MGW that does not receive the paging message receives the query response, and routes the received paging response message to the MSC server.

Correspondingly, one embodiment of the present invention further provides an MGW, which includes a message receiving unit and a broadcast query unit.

The message receiving unit is configured to receive a paging response message sent by a BSC/RNC, and send the received paging response message to the broadcast query unit after determining that no corresponding relation between an IMSI carried in the message and an MSC server exists.

The broadcast query unit is configured to receive the paging response message sent by the message receiving unit, broadcast a query message carrying information about the IMSI carried in the paging response message to all MSC servers in an MSC pool, receive a query response returned by an MSC server acknowledging that the MSC server sends a paging message corresponding to the IMSI, and route the paging response message to the MSC server.

In the third technical solution of the present invention, after receiving the paging response message sent by the BSC/RNC, the MGW that does not receive the paging message may determine which MSC server sends the corresponding paging message by broadcasting a query message to all MSC servers in the MSC pool, and then correctly route the received paging response message. As such, the problem that the route of the paging response message cannot be determined is avoided, thereby improving the paging success ratio.

A fourth technical solution of the present invention is provided as follows. One embodiment of The present invention provides a method for realizing paging in an MSC pool, which includes the following steps:

An MSC server selects a fixed MGW from more than one MGW connected to a BSC/RNC that receives a paging message, and delivers a paging message of an IMSI paging type to the fixed MGW.

The fixed MGW receives the paging message, sends the received paging message to a BSC/RNC specified in the message, and stores a corresponding relation between an IMSI carried in the message and the MSC server that delivers the message.

The MGW that does not receive the paging message receives a paging response message sent by the BSC/RNC, and forwards the received paging response message to the fixed MGW.

The fixed MGW receives the paging response message, determines an MSC server corresponding to an IMSI carried in the paging response message by looking up the corresponding relation between the IMSI and the MSC server stored therein, and routes the received paging response message to the corresponding MSC server.

Correspondingly, one embodiment of the present invention further provides an MGW, which includes a message receiving unit and a message forwarding unit.

The message receiving unit is configured to receive a paging response message sent by a BSC/RNC, and send the received paging response message to the message forwarding unit after determining that no corresponding relation between an IMSI carried in the message and an MSC server exists.

The message forwarding unit is configured to receive the paging response message, and forward the received paging response message to another preset MGW connected to the BSC/RNC.

In the fourth technical solution of the present invention, the MSC server delivers the paging message through a fixed MGW, and the MGW that does not receive the paging message also forwards the paging response message through the fixed MGW after receiving the paging response message. Because the fixed MGW is the MGW that forwards the paging message to the BSC/RNC, and records the corresponding relation between the IMSI and the MSC server therein, the paging response message received by the MGW that does not receive the paging message can be correctly routed through the fixed MGW. As such, the problem that the route of the paging response message cannot be determined is avoided, thereby improving the paging success ratio.

DETAILED DESCRIPTION OF THE EMBODIMENTS

It can be seen from the conventional art that, the existing paging method easily causes the problem that the paging response message cannot be correctly routed in the softswitch architecture, resulting in a paging failure. In order to solve the problem, the present invention provides a method for realizing paging in an MSC pool, so as to ensure a normal paging operation and improve the paging success ratio.

In order to make the objectives, technical solutions, and advantages of the present invention more comprehensible, the present invention is further described in detail below with reference to embodiments and the accompanying drawings.

First Embodiment

Figure 1:
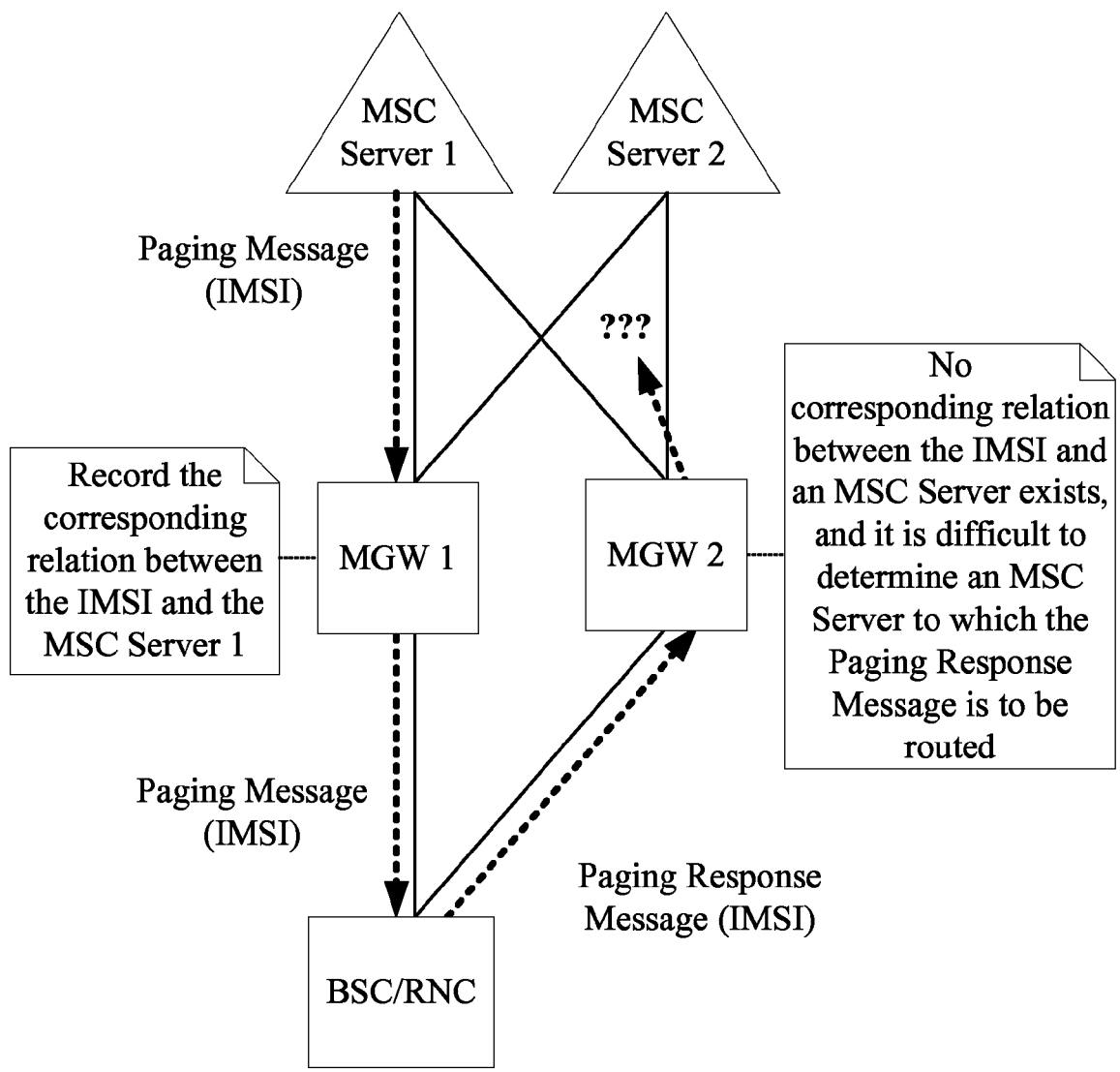
FIG. 1 is a schematic view of a paging process in a softswitch architecture in the conventional art.
Figure 2:
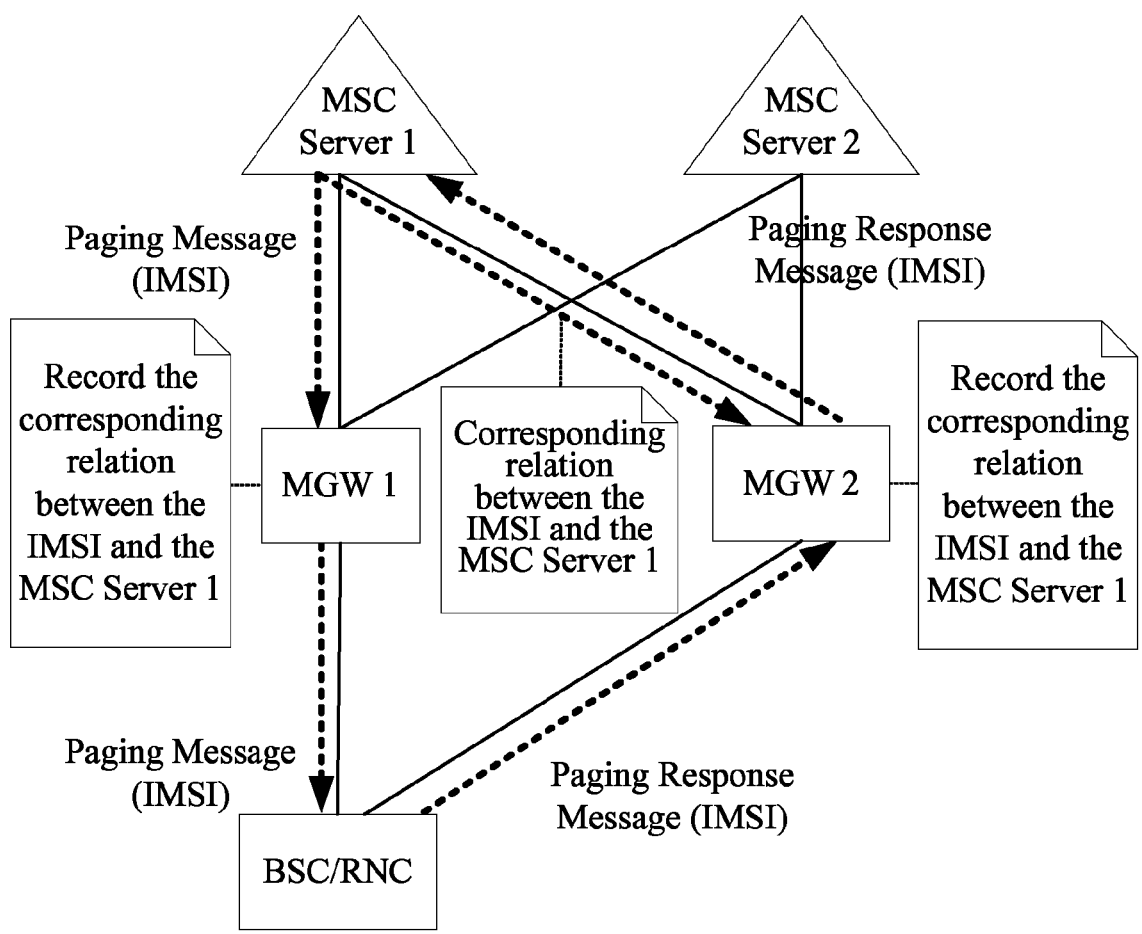
FIG. 2 is a schematic view of a paging process according to a first embodiment of the present invention.

Referring to FIG. 2, a paging process in this embodiment mainly includes the following steps.

In Step 201, an MSC Server 1 sends a paging message of an IMSI paging type, and determines the number of MGWs connected to a BSC/RNC that receives the paging message. If the BSC/RNC is connected to only one MGW, the MSC Server 1 only needs to deliver the paging message through the only one MGW connected to the BSC/RNC, without performing any other processing. If the BSC/RNC is connected to more than one MGW, when sending the paging message through an MGW connected to the BSC/RNC, the MSC Server 1 also needs to send a corresponding relation between the MSC Server 1 and an IMSI carried in the paging message to other MGWs connected to the BSC/RNC.

In FIG. 2, the BSC/RNC is connected to two MGWs, namely, an MGW 1 and an MGW 2. When delivering the paging message to the BSC/RNC through the MGW 1, the MSC Server 1 also needs to send a corresponding relation between an IMSI carried in the paging message and the MSC Server 1 to the MGW 2. Here, the MSC Server 1 may send the corresponding relation between the IMSI and the MSC Server 1 to the MGW 2 through a dedicated notification message. Alternatively, the MSC Server 1 sends an ordinary paging message to the MGW 2 to instruct the MGW 2 to record the corresponding relation between the IMSI and the MSC Server 1, where the MGW 2 does not need to forward the paging message to the BSC/RNC.

In this embodiment, information about the MGWs connected to each BSC/RNC needs to be preconfigured on the MSC servers in the pool. When sending a paging message, an MSC server may determine the number of MGWs connected to a BSC/RNC that receives the paging message by querying the preconfigured information.

In Step 202, after receiving the paging message of the IMSI paging type, the MGW 1 forwards the received paging message to a BSC/RNC specified in the message, and records a corresponding relation between the IMSI carried in the message and the MSC Server 1 that delivers the paging message.

In Step 203, after receiving a paging response message which is returned by a terminal and carrying an IMSI, the BSC/RNC selects an MGW from the MGW 1 and the MGW 2 according to a link load balancing principle, and forwards the paging response message to the selected MGW. At this time, because both the MGW 1 and the MGW 2 have stored the corresponding relation between the IMSI and the MSC Server 1, both the MGW 1 and the MGW 2 can correctly route the paging response message to the MSC Server 1 according to the information about the IMSI carried in the paging response message as well as the corresponding relation between the IMSI and the MSC Server 1 stored therein, no matter the BSC/RNC selects the MGW 1 or the MGW 2.

Second Embodiment

Figure 3:
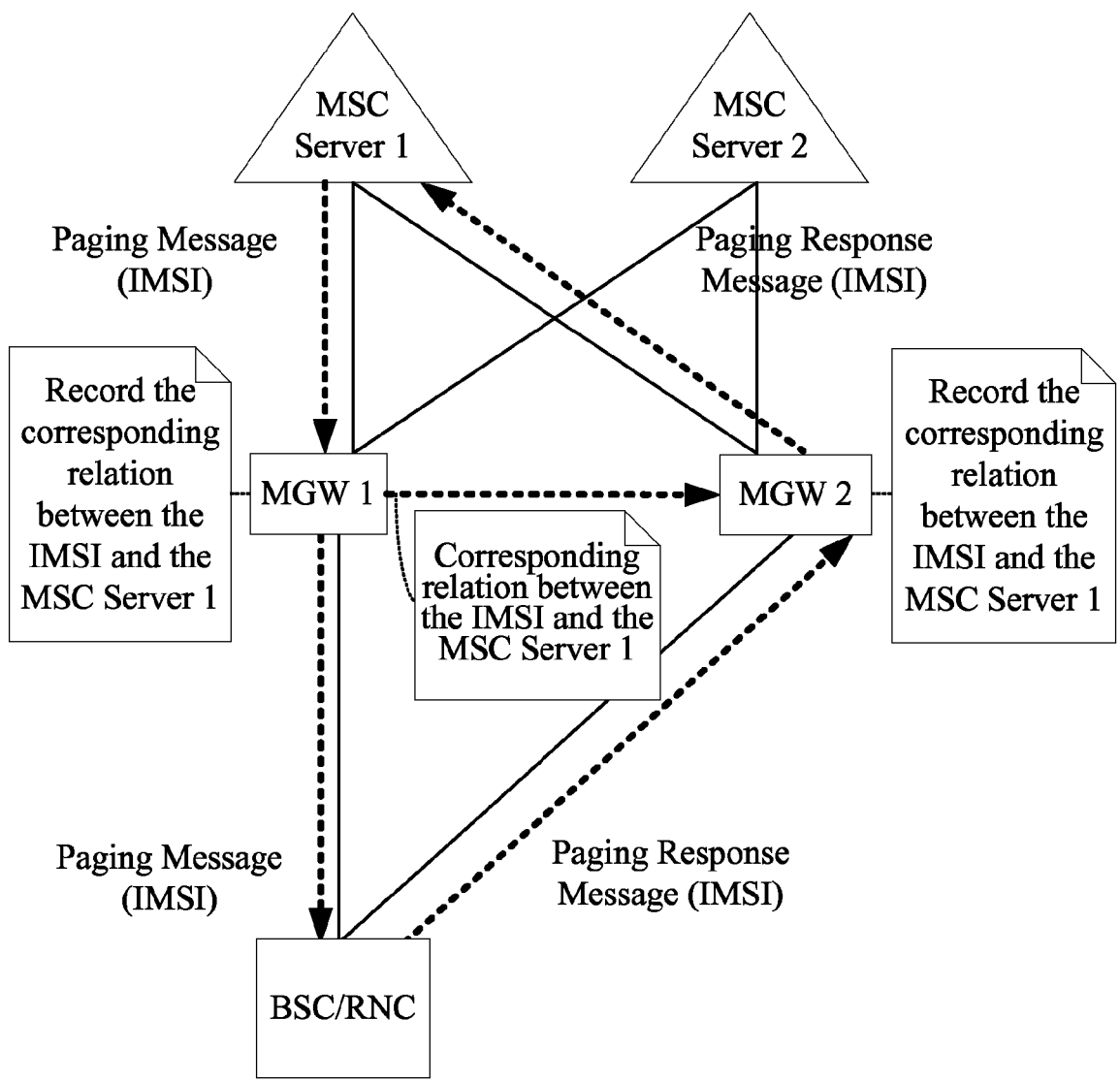
FIG. 3 is a schematic view of a paging process according to a second embodiment of the present invention.

Referring to FIG. 3, a paging process in this embodiment mainly includes the following steps.

In Step 301, an MSC Server 1 selects an MGW, for example, an MGW 1, from MGWs connected to a BSC/RNC, and delivers a paging message of an IMSI paging type to the BSC/RNC, in which the message carries information about the IMSI.

In Step 302, after receiving the paging message delivered by the MSC Server 1, the MGW 1 forwards the received paging message to a BSC/RNC specified in the message, and records a corresponding relation between the IMSI carried in the message and the MSC Server 1 that delivers the message. Meanwhile, the MGW 1 determines the number of the MGWs connected to the BSC/RNC that receives the paging message. If the BSC/RNC is only connected to the MGW 1, the MGW 1 does not need to perform any other processing. If the BSC/RNC is connected to more than one MGW, the MGW 1 also needs to send the corresponding relation between the IMSI and the MSC Server 1 to other MGWs connected to the BSC/RNC. Here, information about the MGWs connected to the BSC/RNC may be preconfigured on the MGWs.

In FIG. 3, the BSC/RNC is connected to two MGWs, namely, the MGW 1 and an MGW 2. After receiving the paging message delivered by the MSC Server 1, the MGW 1 not only needs to record the corresponding relation between the IMSI carried in the message and the MSC Server 1, but also needs to send the corresponding relation between the IMSI and the MSC Server 1 to the MGW 2.

Step 303 is the same as Step 203, so the details will not be described herein again.

Third Embodiment

Figure 4:
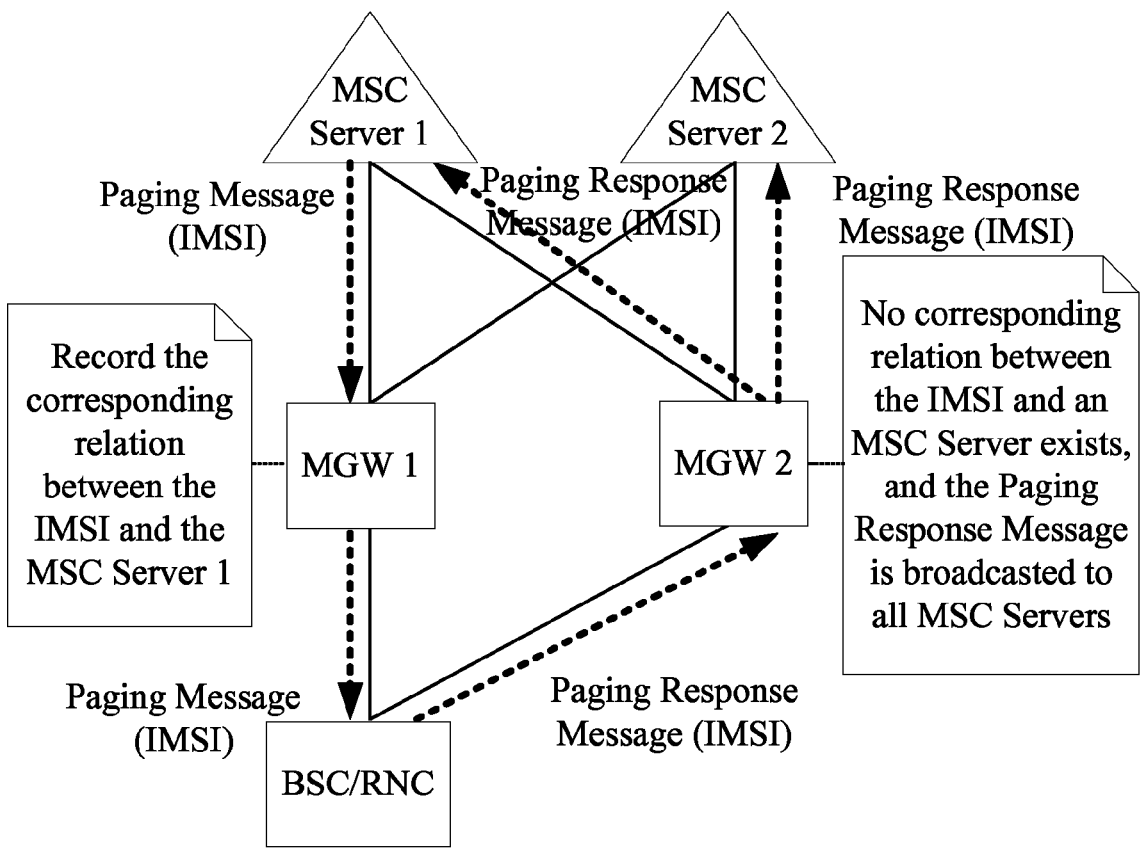
FIG. 4 is a schematic view of a paging process according to a third embodiment of the present invention.

Referring to FIG. 4, a paging process in this embodiment mainly includes the following steps.

In Step 401, an MSC Server 1 delivers a paging message of an IMSI paging type to a BSC/RNC through an MGW 1, in which the message carries information about the IMSI.

In Step 402, after receiving the paging message delivered by the MSC Server 1, the MGW 1 forwards the received paging message to a BSC/RNC specified in the message, and records a corresponding relation between the IMSI carried in the message and the MSC Server 1 that delivers the message.

In Step 403, after receiving a paging response message carrying an IMSI returned by a terminal, the BSC/RNC selects an MGW from the MGW 1 and an MGW 2 according to a link load balancing principle, and forwards the paging response message to the selected MGW. If the MGW 1 is selected, the MGW 1 routes the paging response message to the MSC Server 1 according to the IMSI carried in the paging response message as well as the corresponding relation between the IMSI and the MSC Server 1 recorded therein. If the MGW 2 is selected, the MGW 2 cannot find any corresponding relation between the IMSI carried in the paging response message and an MSC server, and thus cannot determine a message destination, and at this time, the MGW 2 broadcasts the paging response message to all MSC servers in the pool. The MSC server that delivers the paging message corresponding to the IMSI carried in the paging response message receives and processes the paging response message, and the MSC server that does not deliver the corresponding paging message directly discards the paging response message. In FIG. 4, the MSC Server 1 processes the paging response message broadcasted by the MGW 2, and an MSC Server 2 directly discards the paging response message broadcasted by the MGW 2.

Fourth Embodiment

Figure 5:
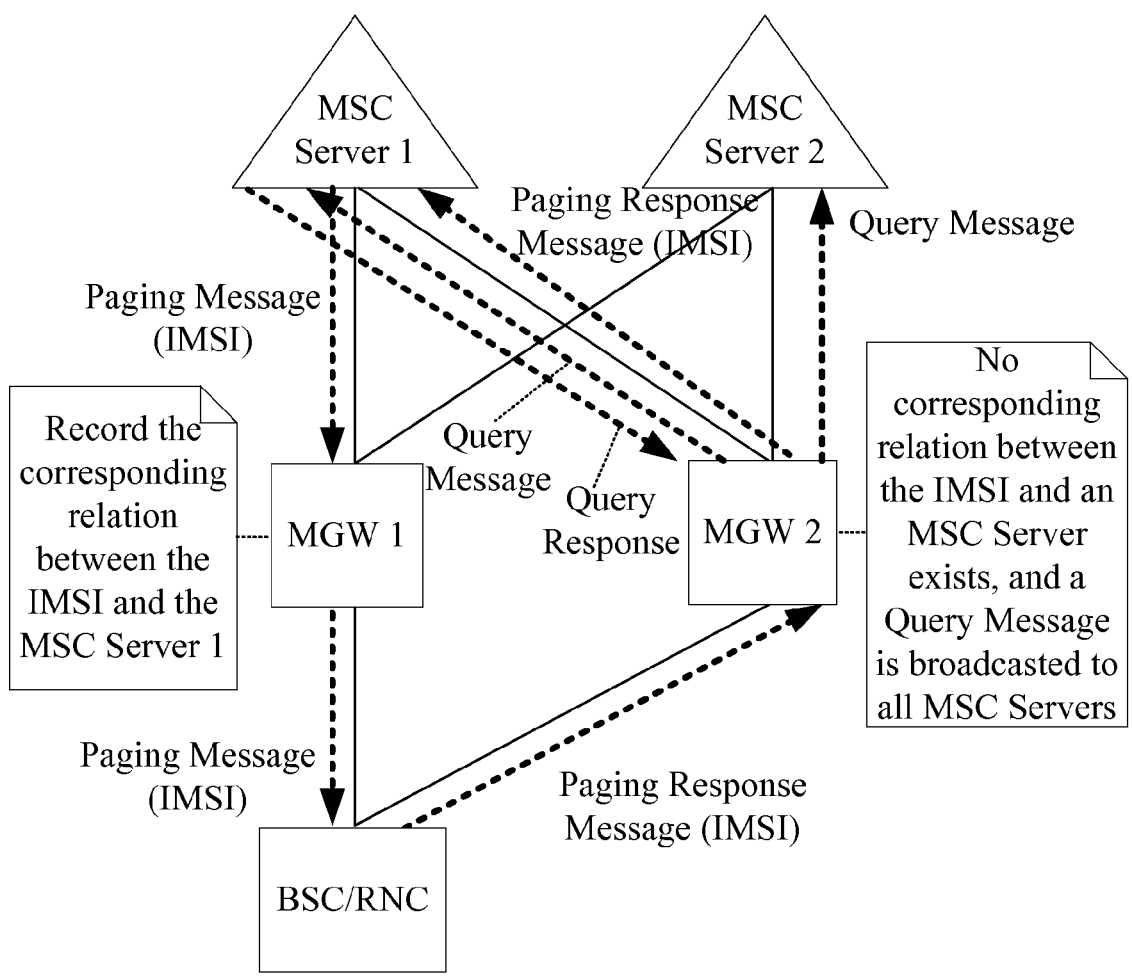
FIG. 5 is a schematic view of a paging process according to a fourth embodiment of the present invention.

Referring to FIG. 5, a paging process in this embodiment mainly includes the following steps.

Steps 501 to 502 are the same as Steps 401 to 402, so the details will not be described herein again.

In Step 503, after receiving a paging response message carrying an IMSI returned by a terminal, the BSC/RNC selects an MGW from an MGW 1 and an MGW 2 according to a link load balancing principle, and forwards the paging response message to the selected MGW. If the MGW 1 is selected, the MGW 1 routes the paging response message to the MSC Server 1 according to the IMSI carried in the paging response message as well as the corresponding relation between the IMSI and the MSC Server 1 recorded therein. If the MGW 2 is selected, the MGW 2 cannot find any corresponding relation between the IMSI carried in the paging response message and an MSC server, and at this time, the MGW 2 broadcasts a query message carrying the information about the IMSI to all MSC servers in the pool, so as to determine which MSC server sends the paging message corresponding to the IMSI. After receiving the query message, the MSC Server 1 that sends the corresponding paging message returns a query response to the MGW 2, acknowledging that the MSC Server 1 sends the corresponding paging message. The MGW 2 receives the query response returned by the MSC Server 1, and routes the paging response message to the MSC Server 1. After receiving the query message, the MSC server that does not send the corresponding paging message, that is, the MSC Server 2, either does not return any response message, or returns a response message indicating that the MSC Server 2 does not deliver the corresponding paging message.

Fifth Embodiment

Figure 6:
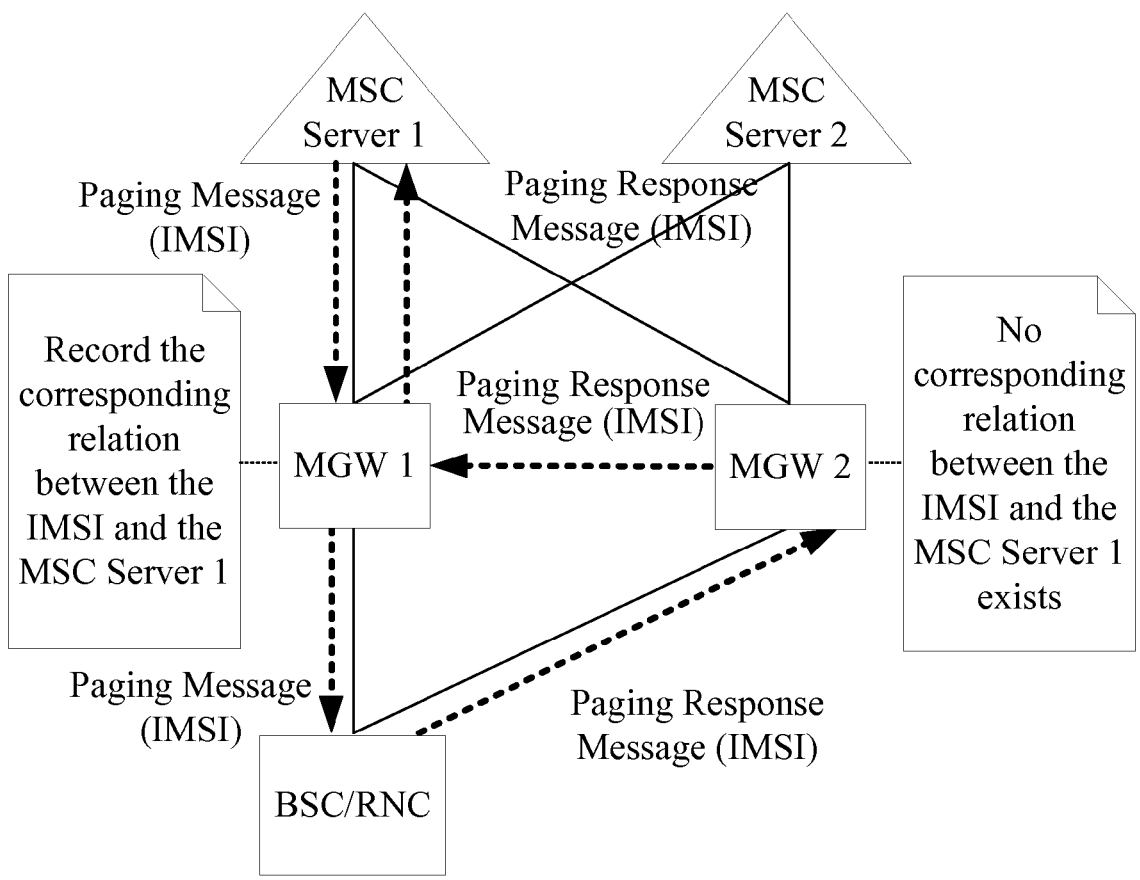
FIG. 6 is a schematic view of a paging process according to a fifth embodiment of the present invention.

Referring to FIG. 6, a paging process in this embodiment mainly includes the following steps.

In Step 601, before delivering a paging message of an IMSI paging type, an MSC Server 1 determines the number of MGWs connected to a BSC/RNC that receives the paging message by querying configuration information thereof. Here, information about the MGWs connected to each BSC/RNC needs to be preconfigured on the MSC servers in the pool. When the BSC/RNC that receives the paging message is connected to more than one MGW, the MSC Server 1 selects a fixed MGW from the plurality of MGWs connected to the BSC/RNC, and sends the paging message to the fixed MGW.

The fixed MGW may be selected through data configuration or by using an algorithm. For example, in FIG. 6, it is configured that all paging messages of the IMSI paging type to be delivered to the BSC/RNC are fixedly sent to an MGW 1. Alternatively, an IMSI in the paging message is hashed according to the number of the MGWs connected to the BSC/RNC, and then a fixed MGW is selected according to a hash result. If the hash result is 0, the MGW 1 is selected; and if the hash result is 1, an MGW 2 is selected.

In Step 602, if the MSC Server 1 sends the paging message to the MGW 1, the MGW 1 receives the paging message, forwards the received paging message to a BSC/RNC specified in the message, and records a corresponding relation between the IMSI carried in the message and the MSC Server 1 that delivers the paging message.

In Step 603, after receiving a paging response message returned by a terminal, the BSC/RNC selects the MGW 1 or the MGW 2, and forwards the paging response message to the MGW 1 or the MGW 2. If the MGW 1 is selected, the MGW 1 routes the paging response message to the MSC Server 1 according to an IMSI carried in the paging response message as well as the corresponding relation between the IMSI and the MSC Server 1 recorded therein. If the MGW 2 is selected, the MGW 2 selects a fixed MGW by using the same method as that used by the MSC server for selecting a fixed MGW in Step 501, and forwards the paging response message to the fixed MGW. That is to say, if the MSC server adopts a data configuration method, the MGW adopts the same data configuration; and if the MSC server adopts an algorithm, the MGW adopts the same algorithm.

In FIG. 6, the paging message of the IMSI paging type delivered to the BSC/RNC is forwarded by the MGW 1, and the MGW 2 needs to forward the paging response message to the MGW 1.

In Step 604, after receiving the paging response message forwarded by the MGW 2, the MGW 1 routes the paging response message to the MSC Server 1 according to the IMSI carried in the message as well as the corresponding relation between the IMSI and the MSC Server 1 stored therein.

Figure 7:
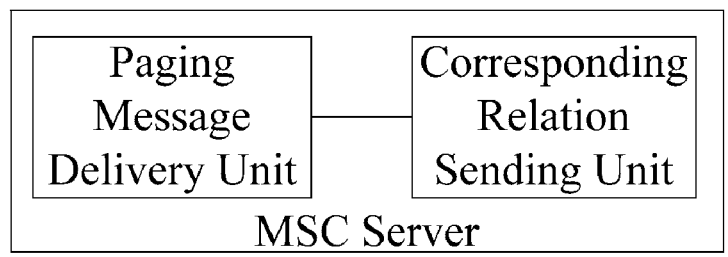
FIG. 7 is a schematic structural view of an MSC server according to an embodiment of the present invention.

Corresponding to the first embodiment, the present invention further provides an MSC server, which mainly includes a paging message delivery unit and a corresponding relation sending unit, as shown in FIG. 7.

The paging message delivery unit is configured to select an MGW from more than one MGW connected to a BSC/RNC that receives a paging message, deliver a paging message of an IMSI paging type to the selected MGW, and send information about the selected MGW to the corresponding relation sending unit.

The corresponding relation sending unit is configured to receive the MGW information sent by the paging message delivery unit, send a corresponding relation between an IMSI carried in the paging message and the MSC server to the MGW(s) which is connected to the BSC/RNC and does not receive the paging message.

Figure 8:
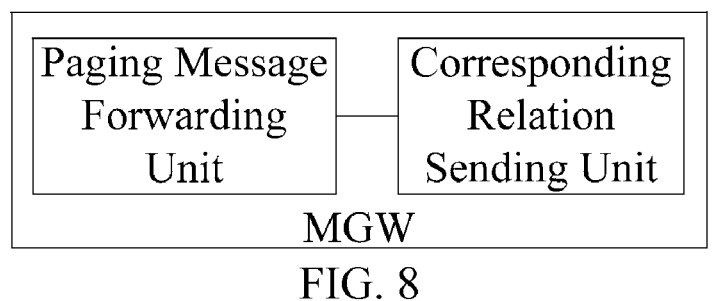
FIG. 8 is a schematic structural view of a first MGW according to an embodiment of the present invention.

Corresponding to the second embodiment, the present invention further provides an MGW, which mainly includes a paging message forwarding unit and a corresponding relation sending unit, as shown in FIG. 8.

The paging message forwarding unit is configured to send a received paging message to a BSC/RNC specified in the message, store a corresponding relation between an IMSI carried in the message and an MSC server that delivers the message, and send the corresponding relation between the IMSI and the MSC server to the corresponding relation sending unit.

The corresponding relation sending unit is configured to receive the corresponding relation sent by the paging message forwarding unit, and send the received corresponding relation to other MGWs connected to the specified BSC/RNC.

Figure 9:
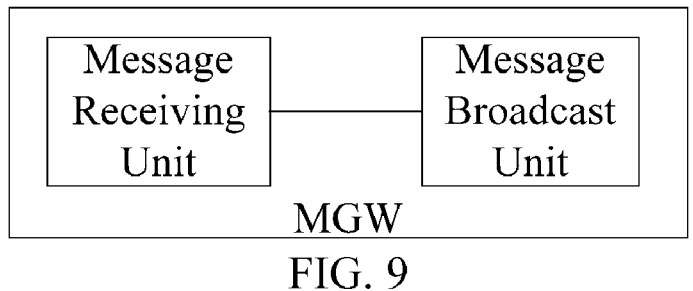
FIG. 9 is a schematic structural view of a second MGW according to an embodiment of the present invention.

Corresponding to the third embodiment, the present invention further provides an MGW, which mainly includes a message receiving unit and a message broadcast unit, as shown in FIG. 9.

The message receiving unit is configured to receive a paging response message sent by a BSC/RNC, and send the received paging response message to the message broadcast unit after determining that no corresponding relation between an IMSI carried in the message and an MSC server exists.

The message broadcast unit is configured to broadcast the received paging response message to all MSC servers in an MSC pool.

Figure 10:
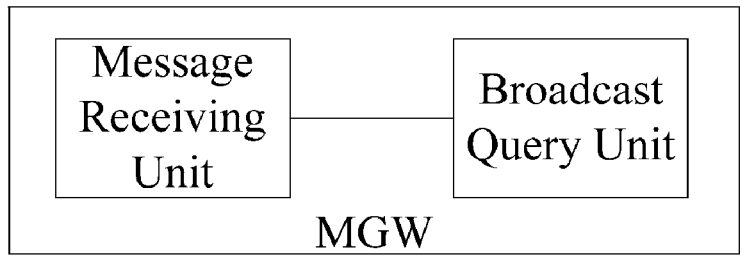
FIG. 10 is a schematic structural view of a third MGW according to an embodiment of the present invention.

Corresponding to the fourth embodiment, the present invention further provides an MGW, which mainly includes a message receiving unit and a broadcast query unit, as shown in FIG. 10.

The message receiving unit is configured to receive a paging response message sent by a BSC/RNC, and send the received paging response message to the broadcast query unit after determining that no corresponding relation between an IMSI carried in the message and an MSC server exists.

The broadcast query unit is configured to receive the paging response message sent by the message receiving unit, broadcast a query message carrying information about the IMSI carried in the paging response message to all MSC servers in an MSC pool, receive a query response returned by an MSC server acknowledging that the MSC server sends a paging message corresponding to the IMSI, and route the paging response message to the MSC server.

Figure 11:
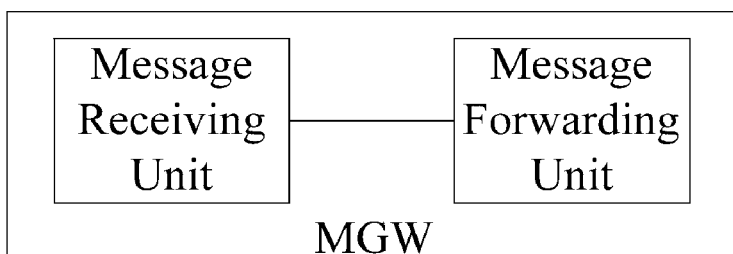
FIG. 11 is a schematic structural view of a fourth MGW according to an embodiment of the present invention.

Corresponding to the fifth embodiment, the present invention further provides an MGW, which mainly includes a message receiving unit and a message forwarding unit, as shown in FIG. 11.

The message receiving unit is configured to receive a paging response message sent by a BSC/RNC, and send the received paging response message to the message forwarding unit after determining that no corresponding relation between an IMSI carried in the message and an MSC server exists.

The message forwarding unit is configured to receive the paging response message, and forward the received paging response message to another preset MGW connected to the BSC/RNC.

The message forwarding unit further includes a data configuration unit and a message transmission unit.

The data configuration unit is configured to store information about an MGW for forwarding the paging response message corresponding to the BSC/RNC.

The message transmission unit is configured to receive the paging response message, acquire the information about the MGW for forwarding the paging response message corresponding to the BSC/RNC that sends the message from the data configuration unit, and forward the received paging response message to the MGW.

The message forwarding unit may also include a hash unit and a message transmission unit.

The message transmission unit is configured to receive the paging response message, send information about the IMSI carried in the message to the hash unit, receive information about an MGW returned by the hash unit, and send the received paging response message to the MGW.

The hash unit is configured to receive the information about the IMSI sent by the message transmission unit, hash the received IMSI according to the number of MGWs connected to the BSC/RNC that sends the paging response message, determine an MGW according to a hash result, and send information about the determined MGW to the message transmission unit.

Finally, it should be noted that, the present invention is applicable to all scenarios where the NNSF function is implemented independent of the BSC/RNC. Moreover, the technical solutions of the present invention are applicable to various fields such as GSM, CDMA, WCDMA, and TD-SCDMA.

The objectives, technical solutions, and beneficial effects of the present invention have been described in further detail above. It should be understood that the above descriptions are not intended to limit the present invention. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for realizing paging in a mobile switching center (MSC) pool, comprising:
    selecting, by an MSC server, a media gateway (MGW) from more than one MGW connected to a base station controller (BSC)/radio network controller (RNC), delivering a paging message of an international mobile station identity (IMSI) paging type to the selected MGW, wherein the selected MGW that receives the paging message further sends the paging message to the BSC/RNC, wherein a MGW that is connected to the BSC/RNC and does not receive the paging message receives a paging response message from the BSC/RNC that receives the paging message; and
    storing, by the MGW that is connected to the BSC/RNC and does not receive the paging message a corresponding relation between an IMSI carried in the paging message and the MSC server; and
    determining, by the MGW that is connected to the BSC/RNC and does not receive the paging message, the MSC server corresponding to the IMSI carried in the paging response message by looking up the corresponding relation between the IMSI carried in the paging response and the MSC server stored therein after receiving the paging response message sent by the BSC/RNC, and routing the received paging response message to the MSC server.

2. The method according to claim 1, wherein the storing, by the MGW that is connected to the BSC/RNC and does not receive the paging message, the corresponding relation between the IMSI carried in the paging message and the MSC server comprises:
    sending, by the MSC server, the corresponding relation between the IMSI carried in the paging message and the MSC server to the MGW that is connected to the BSC/RNC and does not receive the paging message; and
    storing, by the MGW that is connected to the BSC/RNC and does not receive the paging message, the corresponding relation between the IMSI carried in the paging message and the MSC server.

3. The method according to claim 1, wherein the storing, by the MGW that is connected to the BSC/RNC and does not receive the paging message, the corresponding relation between the IMSI carried in the paging message and the MSC server comprises:
    sending, by the MGW that receives the paging message, the corresponding relation between the IMSI carried in the paging message and the MSC server to the MGW that is connected to the BSC/RNC and does not receive the paging message; and
    storing, by the MGW that is connected to the BSC/RNC and does not receive the paging message, the corresponding relation between the IMSI carried in the paging message and the MSC server.

4. The method according to claim 2, wherein the sending, by the MSC server, the corresponding relation between the IMSI carried in the paging message and the MSC server to the MGW that is connected to the BSC/RNC and does not receive the paging message comprises:
    sending, by the MSC server, the corresponding relation between the IMSI carried in the paging message and the MSC server to the MGW that is connected to the BSC/RNC and does not receive the paging message through a notification message; or
    sending, by the MSC server, the paging message to the MGW that is connected to the BSC/RNC and does not receive the paging message, so as to instruct the MGW to store the corresponding relation between the IMSI carried in the paging message and the MSC server, wherein the MGW does not need to forward the paging message.

5. A mobile system for realizing paging in a mobile switching center (MSC) pool, comprising:
    a mobile switching center (MSC) server, comprising a paging message delivery unit and a corresponding relation sending unit, wherein:
    the paging message delivery unit is configured to select a media gateway (MGW) from more than one MGW connected to a base station controller/radio network controller (BSC/RNC), deliver a paging message of an international mobile station identity (IMSI) paging type to the selected MGW, and send information about the selected MGW to the corresponding relation sending unit, wherein the selected MGW that receives the paging message further sends the paging message to the BSC/RNC;
    the corresponding relation sending unit is configured to receive the MGW information sent by the paging message delivery unit, send a corresponding relation between an IMSI carried in the paging message and the MSC server to the MGW which is connected to the BSC/RNC and does not receive the paging message;
    the mobile system further comprising: the MGW which is connected to the BSC/RNC and does not receive the paging message, wherein:
    the MGW that is connected to the BSC/RNC and does not receive the paging message is configured to store a corresponding relation between an IMSI carried in the paging message and the MSC server;
    the MGW that is connected to the BSC/RNC and does not receive the paging message is further configured to receive a paging response message from the BSC/RNC that receives the paging message; and
    the MGW that is connected to the BSC/RNC and does not receive the paging message is further configured to determine the MSC server corresponding to the IMSI carried in the paging response message by looking up the corresponding relation between the IMSI carried in the paging response and the MSC server stored therein after receiving the paging response message sent by the BSC/RNC, and route the received paging response message to the MSC server.

6. A mobile system for realizing paging in a mobile switching center (MSC) pool, comprising:
    a MSC server is configured to select a media gateway (MGW) from more than one MGW connected to a base station controller (BSC)/radio network controller (RNC) and deliver a paging message of an international mobile station identity (IMSI) paging type to the MGW;
    the media gateway (MGW), comprising a paging message forwarding unit and a corresponding relation sending unit wherein:

the paging message forwarding unit IS configured to send the received paging message the BSC/RNC specified in the paging message, store a corresponding relation between an international mobile station identity (IMSI) carried in the paging message and the mobile switching center (MSC) that delivers the paging message, and send the corresponding relation to the corresponding relation sending unit; and the corresponding relation sending unit is configured to receive the corresponding relation sent by the paging message forwarding unit, and send the received corresponding relation to other MGWs connected to the specified BSC/RNC and does not receive the paging message, wherein one MGW of the other MGWs receives a paging response message from the BSC/RNC that receives the paging message, and sends the paging response message to the MSC server to the received corresponding relation.

* * * * *